US006311849B1

(12) United States Patent

Sbaschnigg et al.

(10) Patent No.: US 6,311,849 B1
(45) Date of Patent: Nov. 6, 2001

(54) DEVICE FOR DEHYDRATING AND WASHING SUSPENSIONS OF FIBROUS MATERIAL

(75) Inventors: Johann Sbaschnigg; Wilhelm Mausser, both of Graz; Franz Petschauer, Lannach; Johannes Kappel, Graz, all of (AT)

(73) Assignee: Andritz-Patentverwaltungs-Gesselschaft m.b.H., Graz (AT)

( * ) Notice: Subject to any disclaimer, the term of this patent is extended or adjusted under 35 U.S.C. 154(b) by 0 days.

(21) Appl. No.: 09/424,578

(22) PCT Filed: May 9, 1998

(86) PCT No.: PCT/EP98/02720

§ 371 Date: Nov. 24, 1999

§ 102(e) Date: Nov. 24, 1999

(87) PCT Pub. No.: WO98/54401

PCT Pub. Date: Dec. 3, 1998

(30) Foreign Application Priority Data

May 26, 1997 (AT) ........................................ 890/97

(51) Int. Cl.[7] ........................................ B01D 33/06

(52) U.S. Cl. ........................................ 210/404; 162/251

(58) Field of Search ........................................ 162/203, 205, 162/301, 302, 303, 323, 357, 358.1, 386, 60, 317, 318; 68/43; 210/404

(56) References Cited

U.S. PATENT DOCUMENTS

| | | | | |
|---|---|---|---|---|
| 3,980,518 | * | 9/1976 | Ljung et al. | 162/302 |
| 4,589,923 | * | 5/1986 | Gruenewald | 127/4 |
| 4,750,340 | * | 6/1988 | Anderson | 68/43 |
| 5,667,642 | * | 9/1997 | Luthi | 162/358.1 |

* cited by examiner

*Primary Examiner*—Peter Chin
*Assistant Examiner*—Eric Hug
(74) *Attorney, Agent, or Firm*—Alix, Yale & Ristas, LLP

(57) ABSTRACT

The invention relates to a device for dewatering and washing fibre stock suspensions with two counter-rotating rolls (2, 3), a stock feed (4, 5) and a stock discharge (6). It is mainly characterized by the headbox (4, 5) at the two rolls (2, 3) being arranged separately in the lower section of the rolls (2, 3), and a discharge screw (6) being foreseen for discharge of the filter mat below the gap between the two rolls (2, 3) and a washing zone (9", 10") in the upper part of the rolls (2, 3).

18 Claims, 4 Drawing Sheets

DEVICE FOR DEHYDRATING AND WASHING SUSPENSIONS OF FIBROUS MATERIAL

BACKGROUND OF THE INVENTION

The invention relates to a device for dewatering and washing fibre stock suspensions by two counter-rotating rolls, a stock feed and a stock discharge, where the headbox is separate at the two rolls and a discharge screw (6) is arranged for filter mat discharge below the gap between the two rolls.

Such systems are known which have a lateral stock feed and a downward-running formation zone, where a fibre mat is formed. This may be followed by a displacement wash zone and a subsequent press nip. Here, the stock discharge takes place above the two rolls into a repulper screw. This type of device shows a number of disadvantages, especially the stock discharge is complicated and susceptible to failure because the repulper vat must be sealed off against the rolls. Furthermore, approximately only half of the circumference is utilized for dewatering and washing. Additionally, this type of device has a tendency toward clogging because the force of gravity attempts to separate the fibre mat from the rolls. Operation without wash water is, therefore, not possible. Devices for fibre stock dewatering are also known from WO 96/06221 A and WO 96/18495, which work in counter-rotation of the rolls versus the devices mentioned. This type of equipment cannot, however, be used for washing. WO 96/06221 A furthermore shows a two-roll press with a stock feed arranged approximately in the area of the horizontal diameter. Thus the maximum range of circumference cannot be used. FR 2 006 772 A also shows the dewatering of a fibre stock suspension on a roll, with two superimposed rolls being represented in FIG. 3. Here, two identical units are placed on top of each other. As a result of the difference in the geodetic height and the joint mat take-off on the lower roll, widely different conditions for the two fibre mats are created before pressing them together in gap 59. The fibre mat therefore has widely different characteristics on the upper and lower sides especially with regard to the dewatering and washing degree. Additionally, in such an arrangement, the stock discharge is not foreseen in the lower section of the rolls but essentially between the 3 o'clock and the 4 o'clock positions.

BRIEF SUMMARY OF THE INVENTION

The aim of the present invention is therefore to avoid the disadvantages mentioned and to create a device for fibre stock dewatering and washing which safeguards a high dewatering performance with washing and advantageously shows low rewetting of the fibre mat.

As per the invention, this is achieved by the headbox being foreseen separately in the lower roll section, the axes of the rolls being placed on a horizontal plane, the rolls having channels for filtrate discharge and the channels having inlets arranged against the sense of rotation. This makes it possible to achieve an essentially much simpler stock take-off (take-off of the fibre mat) and utilization of a large part of the circumference of the two rolls and a high efficiency of the device. With the channels for filtrate discharge, which are arranged in the rolls, large quantities of filtrate and wash water can be discharged without any problem. Therefore, an especially favourable displacement washing can also be achieved. With the channels having inlets arranged against the sense of rotation, rewetting of the fibre mat is prevented as far as possible. The efficiency of the device can thus be further increased.

A favourable design of the invention is characterized by a guide plate, whose distance to the roll surface decreases continually, joining the headbox. With this guide plate a continuously increasing pressure on the fibre stock suspension can be created and thus especially favourable dewatering can be performed. A favourable design of the invention is characterized in that a wash zone is arranged in the upper part of the two rolls. This makes it possible to achieve good dewatering as well as, subsequently, good washing.

A favourable advancement of the invention is characterized by the wash zones being separated on both sides by a separative plate, or alternatively in that the wash water feed can be designed as a joint wash pool jointly for both sides. With these designs an optimum adaptation of the washing section and optimum utilization of the roll surface for dewatering and washing can be achieved.

A favourable design of the invention is characterized by the rolls having channels for filtrate discharge, where the channels may have inlets arranged against the sense of rotation. A favourable advancement of the invention is characterized by the channels having additional openings which are connected with the previous channel viewed in the sense of rotation. With such a design an even better filtrate and wash water discharge is possible, whereby rewetting can be further reduced.

A favourable design of the invention is characterized by the roll surface being designed as a perforated plate having large holes, these holes in the perforated plate having a diameter in the range of 10 to 25 mm. With this constructional design cost can be reduced because substantially fewer holes are required and also manufacture is simple and cheaper. The risk of incrustation is also substantially lower and cleaning of the holes is possible even during operation.

A favourable advancement of the invention is characterized by the rolls being individually clothed with wires. With these wires especially favourable dewatering is achievable. Especially the combination of these wires, which are supported by the perforated plates, brings about special advantages versus previously existing variants with small holes (1 to 1.5 mm diameter) drilled into the steel shell of the rolls, which especially constitutes a reduction of the risk of incrustation and more favourable cleaning options. Also it is easily possible to change the wires, and the rolls may be of the cantileverable design.

A favourable advancement of the invention is characterized by both rolls being suitable for being pressed against each other. To control the pressure and thus to increase the final dryness of the fibre mat, the rolls can be pressed against each other, for instance with hydraulic cylinders or other suitable equipment.

An advantageous design of the invention is characterized by the upper parts being suitable for folding down. This makes it possible to dismantle the rolls easily without major disassembling.

BRIEF DESCRIPTION OF THE DRAWINGS

The invention is described in the following in examples based on the drawings, in which.

DESCRIPTION OF THE PREFERRED EMBODIMENT

Figure 1:
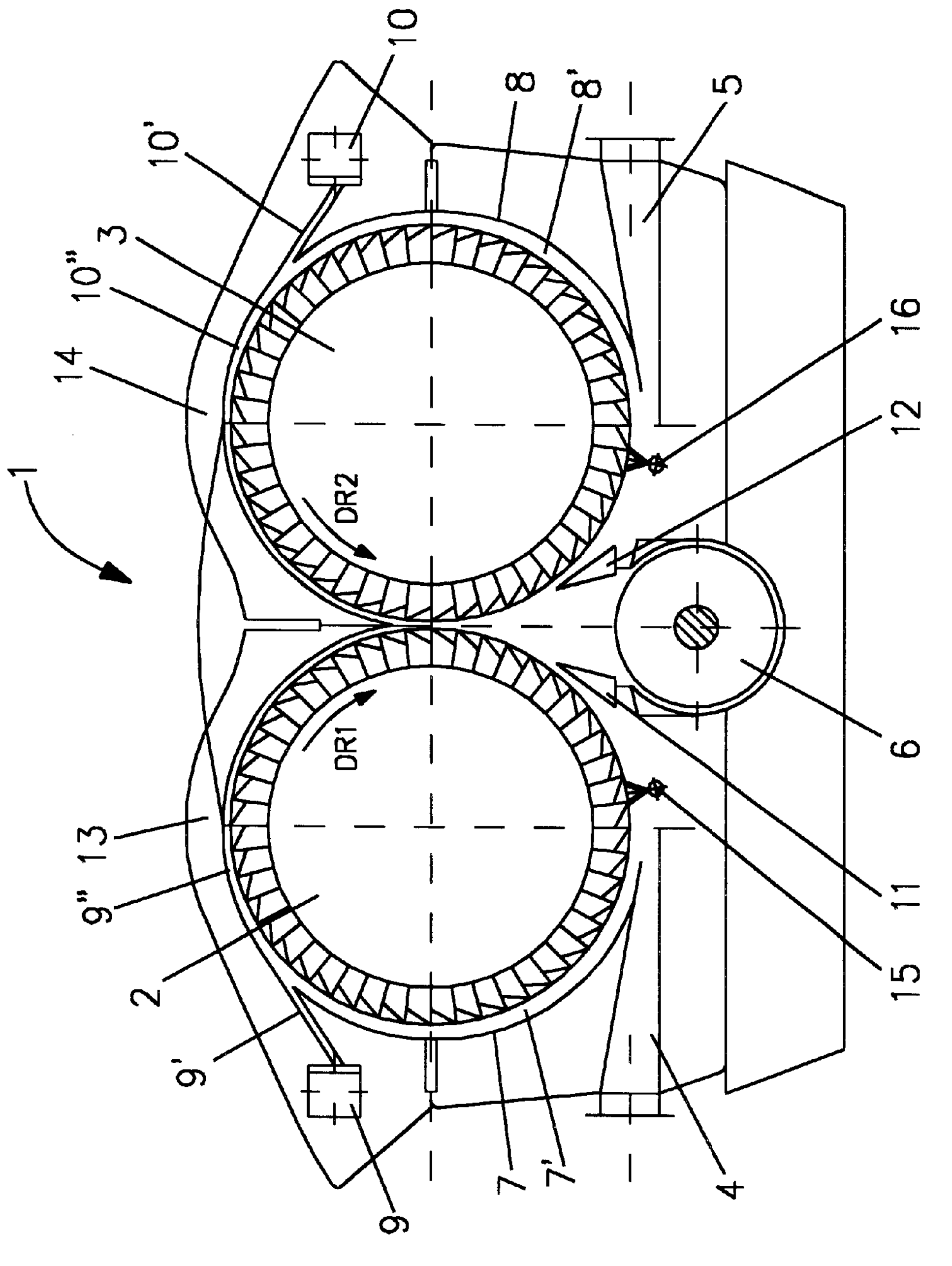
FIG. 1 shows a schematic representation of the device as per the invention, FIG. 2 a detailed representation, FIG. 3 a section X from FIG. 2 and FIG. 4 a view in direction IV in FIG. 2.

FIG. 1 shows a fibre stock washer 1 as per the Invention with dewatering rolls 2,3, the respectively appertaining stock feed 4,5 and its stock discharge screw 6. The fibre suspension is being uniformly fed via stock feed pipes 4,5 over the length to the rolls 2,3 at the lowest position. The feed may be arranged between the 5 o'clock and the 9 o'clock position. Thus, a much larger part of the circumference of the rolls 2,3 can be utilized. The suspension is led further into the sections 7' and 8' formed by the guide plates 7,8 and the surfaces of the rolls 2,3, whereby the distance of the guide plates 7,8 to the surface of the rolls 2,3 decreases continually. Thus a continuous increase in pressure and favourable dewatering is safeguarded while the fibre stock mat is formed at the same time. The washing liquid is fed to the wash zones 9",10", which are limited by the plates 9',10' via pipes 9,10. The distance of the plates 9',10' to the surface of the rolls 2,3 may continuously decrease in the sense of rotation DR1, DR2, so that here, too, an increasingly higher pressure is realised for displacement washing. In the lower section of the rolls 2,3 there are take-off doctors 11,12 with which the fibre mat and particularly the residues sticking to the surface of the rolls 2,3 are removed and drop into the discharge screw 6. For better accessibility when performing maintenance work, especially when changing the rolls, upper parts 13,14 which can be folded upwards are foreseen. In the lower section of the rolls 2,3 showers 15,16 are arranged for further cleaning of the surfaces.

Figure 2:
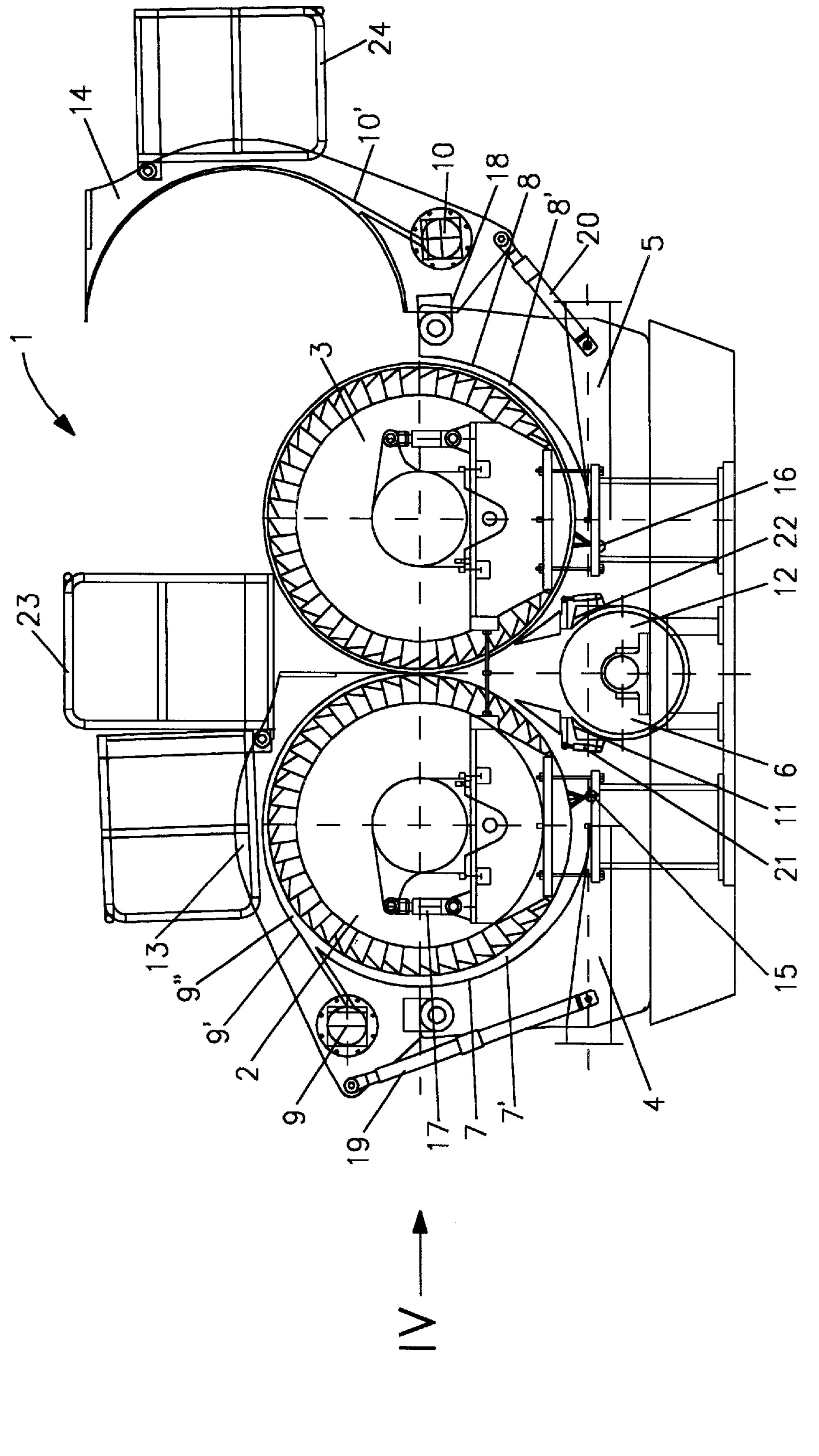

FIG. 2 shows an analogous representation to FIG. 1, and identical parts are designated by identical reference numbers. In supplement hereto especially the hydraulic cylinders 17,18 for pressing the rolls 2,3 against each other can be seen. Also, the cylinders 19,20 for lifting the upper parts 13,14 and the setting cylinders 21,22 for the take-off doctors 11,12 can be seen. Walkways 23,24 for operating personnel are also shown.

Figure 3:
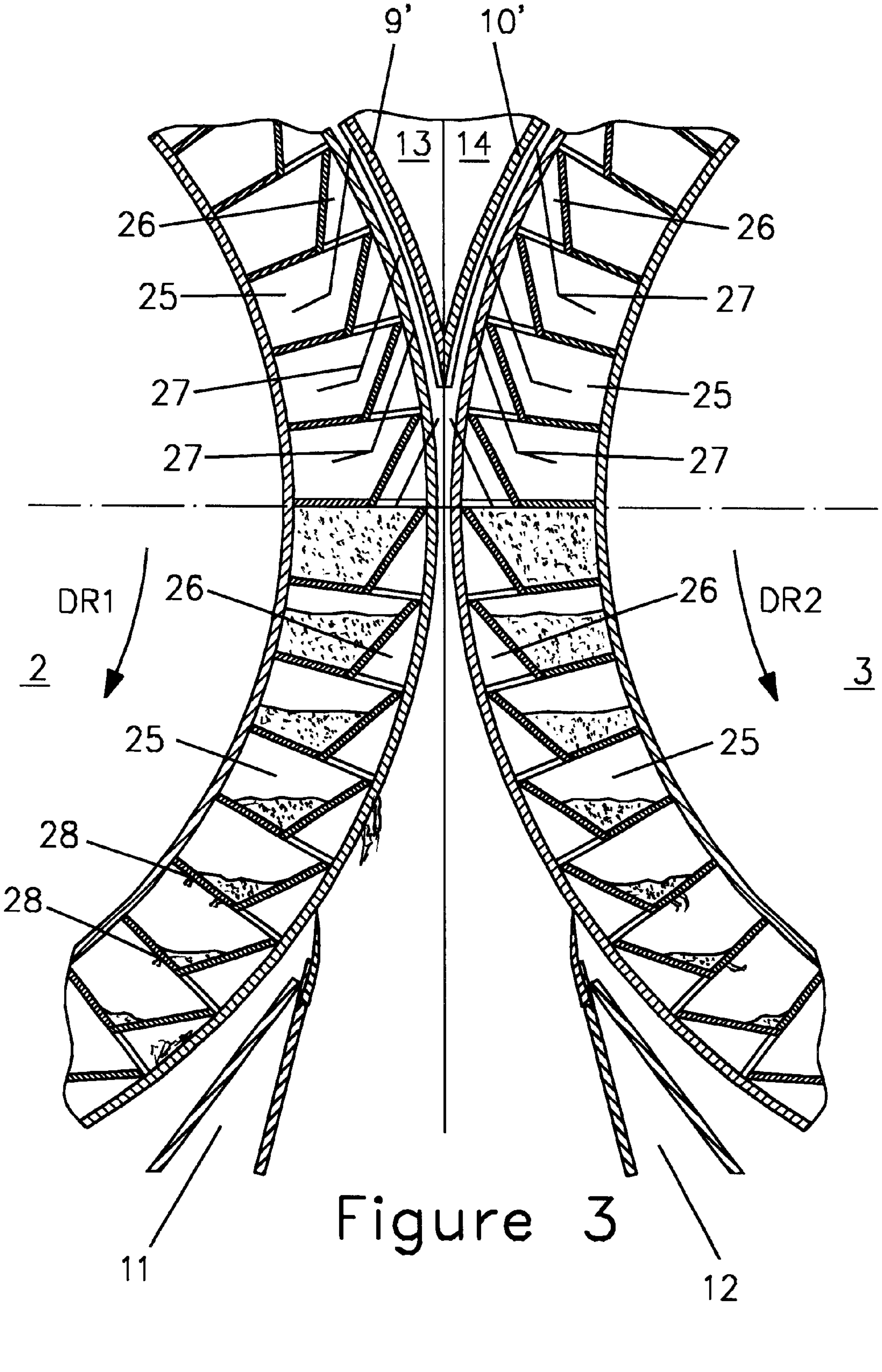

FIG. 3 now shows a section X from FIG. 2, in which the dewatering and wash functions are represented in greater detail. Here, too, identical reference numbers were used as in the other figures. FIG. 3 especially shows the channels 25 of rolls 2,3, through which the filtrate and the wash water are discharged. The inlets 26 which are arranged against the sense of rotation DR1, DR2, whereby the flow of filtrate or water takes place in accordance with the arrows 27, can well be seen. From these channels 25 the liquid is then axially removed. The variant with additional openings 28 through which the filtrate can flow into the previous channels viewed in the sense of rotation DR1, DR2 is shown in the bottom left part. As the filtrate has previously been discharged at least partially through these channels, the volume of the channels 25 for receiving the filtrate or wash water from previous channels 25 can be utilized and thus the tendency for rewetting further reduced.

Figure 4:
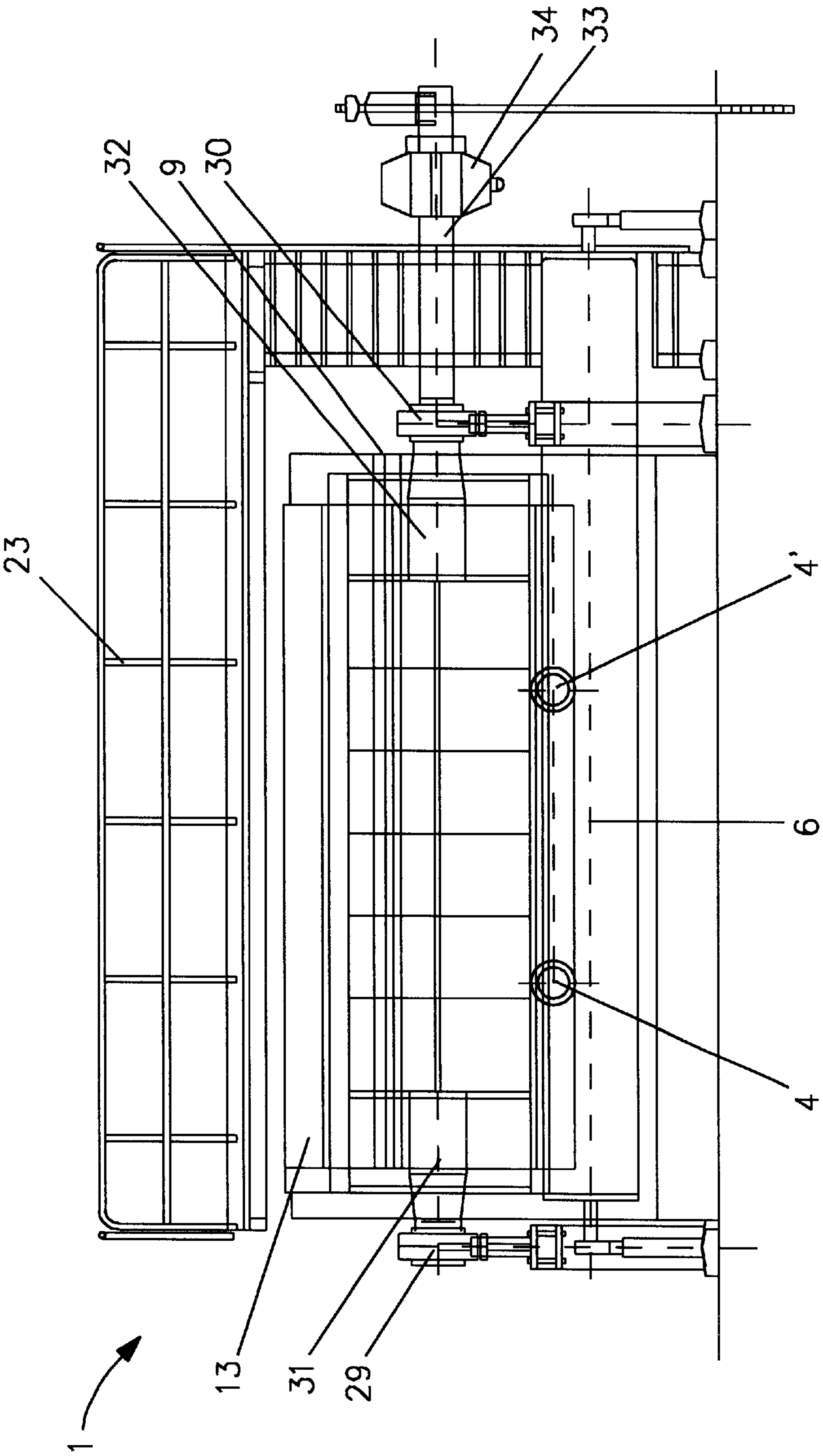

FIG. 4 now shows the view according to the arrow IV in FIG. 2. It can be seen from this that for better distribution of the suspension feed over the length of the rolls 2,3 several stock feed pipes 4,4' can be foreseen and respectively also on the reverse side 5,5' (not represented). The bearings 29,30 for the shaft ends 31,32 of roll 2 and the gear box 34 can also be seen. The filtrate is collected in a tray below the rolls.

The invention is not limited to the variants shown; the wash water feed can, for instance, be designed as a wash pool. In this case, wash water feed takes place centrally, whereby the distribution on both fibre mats takes place automatically. The roll shells can also consist of drilled perforated plates and can be operated without wire clothing.

What is claimed is:

1. A device for dewatering and washing fiber stock suspensions, comprising:

a housing;

two adjacent rolls situated in the housing for counter-rotation about a respective two rotation axes which lie on a horizontal plane, whereby the rolls have outer surfaces which define a dewatering gap therebetween, through which a filter mat formed on each roll is dewatered;

a headbox for each roll, each headbox situated for introducing fiber stock suspension onto the outer surface at the lower half of each roll;

means adjacent the outer surface of each roll, following each headbox in the rotation direction, for applying pressure on the suspension against the outer surface of the roll to partially dewater the suspension and thereby form a filter mat in advance of said gap;

discharge means beneath said gap for removing the filter mat from the rolls and discharging the mat from the housing;

wherein the surface of each roll has openings, each roll has a filtrate drain channel below the outer surface, and the drain channels are fluidly connected to the roll outer surface by inlets which define a filtrate flow path that is oriented from the channels to the roll surface, in a direction against the sense of rotation of the respective roll.

2. Device according to claim 1, wherein said means for applying pressure comprises a guide plate joining and space from the outer surface a distance which decreases continually.

3. Device according to claim 1, comprising a wash zone arranged in the half of the two rolls.

4. Device according to claim 3, wherein the wash zone is separated by a separative plate.

5. Device according to claim 1, wherein the channels have drain openings which are connected to the previous channel viewed in the sense of rotation.

6. Device according to claim 1, wherein the surface of the rolls is a perforated plate having large holes defining one of the inlets.

7. Device according to claim 6, wherein the holes in the perforated plate having a diameter in the range of 10 to 25 mm.

8. Device according to claim 1, wherein the rolls are individually clothed with wires.

9. Device according to claim 1, wherein the two rolls are covered by a respective two upper housing parts and the upper parts are foldable toward and away from each other.

10. Device according to claim 1, comprising means for pressing both rolls against each other.

11. Device according to claim 2, comprising a wash zone arranged in the upper half of the two rolls.

12. Device according to claim 11, wherein the wash zone is separative plate.

13. Device according to claim 2, wherein the channels have drain openings which are connected to the previous channel viewed in sense of rotation.

14. Device according to claim 11, wherein the channels have drain openings which are connected to the previous channel viewed in the sense of rotation.

15. Device according to claim 3, wherein the channels have drain openings which are connected to the previous channel viewed in the sense of rotation.

16. Device according to claim 3, wherein the two rolls are covered by a respective two upper housing parts and the upper parts are foldable toward and away from each other.

17. Device according to claim 12 wherein the two rolls are covered by a respective two upper housing parts and the upper parts are foldable toward and away from each other.

18. Device according to claim 1, wherein the channels extend axially beneath the outer surface of the rolls.

* * * * *

UNITED STATES PATENT AND TRADEMARK OFFICE
CERTIFICATE OF CORRECTION

PATENT NO. : 6,311,849 B1
DATED : November 6, 2001
INVENTOR(S) : Sbaschnigg et al.

It is certified that error appears in the above-identified patent and that said Letters Patent is hereby corrected as shown below:

Column 4,
Line 24, after "plate" delete "joining and space" and insert -- joining the headbox and spaced --.
Line 28, before "half" insert -- upper --.
Line 35, after "one" insert -- end --.
Line 49, before "separative" insert -- separated by a --.
Line 52, before "sense" insert -- the --.

Signed and Sealed this

Twenty-second Day of October, 2002

*Attest:*

JAMES E. ROGAN
*Director of the United States Patent and Trademark Office*

*Attesting Officer*